(12) United States Patent
Glasco et al.

(10) Patent No.: US 8,874,844 B1
(45) Date of Patent: Oct. 28, 2014

(54) PADDING BUFFER REQUESTS TO AVOID READS OF INVALID DATA

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
James Roberts, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 780 days.

(21) Appl. No.: 12/326,760

(22) Filed: Dec. 2, 2008

(51) Int. Cl.
*G06F 12/00* (2006.01)
*G06F 12/08* (2006.01)

(52) U.S. Cl.
CPC ........ *G06F 12/0802* (2013.01); *G06F 12/0862* (2013.01)
USPC .......................................................... 711/118

(58) Field of Classification Search
None
See application file for complete search history.

(56) References Cited

U.S. PATENT DOCUMENTS

| 5,717,893 | A  | * | 2/1998  | Mattson .................... 711/129 |
| 6,223,256 | B1 | * | 4/2001  | Gaither ..................... 711/134 |
| 6,397,302 | B1 | * | 5/2002  | Razdan et al. ............. 711/141 |
| 6,662,173 | B1 |   | 12/2003 | Hammarlund et al. |
| 7,010,649 | B2 | * | 3/2006  | Davis et al. ................ 711/133 |
| 7,409,500 | B2 | * | 8/2008  | Steely et al. ............... 711/119 |
| 7,467,260 | B2 | * | 12/2008 | Averill et al. ............. 711/128 |
| 7,526,607 | B1 | * | 4/2009  | Singh et al. ................ 711/118 |
| 7,725,657 | B2 | * | 5/2010  | Hasenplaugh et al. .... 711/130 |

OTHER PUBLICATIONS

Office Action in U.S. Appl. No. 12/326,764, mailed May 11, 2011.

* cited by examiner

*Primary Examiner* — Matthew Bradley
*Assistant Examiner* — Craig Goldschmidt
(74) *Attorney, Agent, or Firm* — Patterson & Sheridan, LLP

(57) ABSTRACT

A system and method for buffering intermediate data in a processing pipeline architecture stores the intermediate data in a shared cache that is coupled between one or more pipeline processing units and an external memory. The shared cache provides storage that is used by multiple pipeline processing units. The storage capacity of the shared cache is dynamically allocated to the different pipeline processing units as needed, to avoid stalling the upstream units, thereby improving overall system throughput.

24 Claims, 12 Drawing Sheets

PADDING BUFFER REQUESTS TO AVOID READS OF INVALID DATA

BACKGROUND OF THE INVENTION

1. Field of the Invention

The present invention relates generally to the field of data processing and, more specifically, to using a data cache as a dynamically sized buffer to pass data from producers to consumers.

2. Description of the Related Art

In a conventional processing pipeline architecture data is processed by different units, with upstream units producing intermediate data that is consumed by downstream units. Since the rate of consumption and production may vary, buffers are typically deployed between the different units to temporarily store the intermediate data and avoid stalling the upstream units. The buffers are dedicated storage rather than a shared resource. In order to accommodate diverse consumption and production rates, the size of a buffer should be increased. However, since the buffer consumes die area that would otherwise be used for processing circuitry, it is desirable to limit the size of each buffer.

As the foregoing illustrates, what is needed in the art is a mechanism for efficiently buffering intermediate data in a processing pipeline architecture.

SUMMARY OF THE INVENTION

A system and method for buffering intermediate data in a processing pipeline architecture stores the intermediate data in a shared cache that is coupled to one or more pipeline processing units and to an external memory. One advantage of the disclosed method is that the shared cache provides storage that is used by multiple pipeline processing units rather than being dedicated to separately buffer intermediate data for each pipeline processing unit. The storage capacity of the shared cache is dynamically allocated to the different pipeline processing units as needed to avoid stalling the upstream units, thereby improving overall system throughput without using dedicated buffers between the pipeline processing units.

Various embodiments of a method of the invention for preparing and storing data in a cache coupled to one or more clients and to an external memory include producing a write request including intermediate data for storage in a dynamically sized buffer and aligning the intermediate data to correspond with an address that is aligned to a cache line boundary and produce aligned intermediate data. A dynamically sized buffer eviction class is specified for the aligned intermediate data that indicates that other data stored in the cache is evicted from the cache before the aligned intermediate data is evicted from the cache. The write request including the aligned intermediate data is output with an indication of the dynamically sized buffer eviction class.

Various embodiments of the invention include a system for preparing and storing data in a cache. The system includes a cache coupled to an external memory and a computation subsystem including a producer of intermediate data that is coupled to the cache and a first consumer of the intermediate data that is coupled to the cache. The cache is configured to store intermediate data in entries allocated to a dynamically sized buffer. The producer is configured to produce a write request including the intermediate data for storage in the dynamically sized buffer, align the intermediate data to correspond with an address that is aligned to a cache line boundary and produce aligned intermediate data, specify a dynamically sized buffer eviction class for the aligned intermediate data that indicates that other data stored in the cache is evicted from the cache before the aligned intermediate data is evicted from the cache, and output the write request including the aligned intermediate data with an indication of the dynamically sized buffer eviction class.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
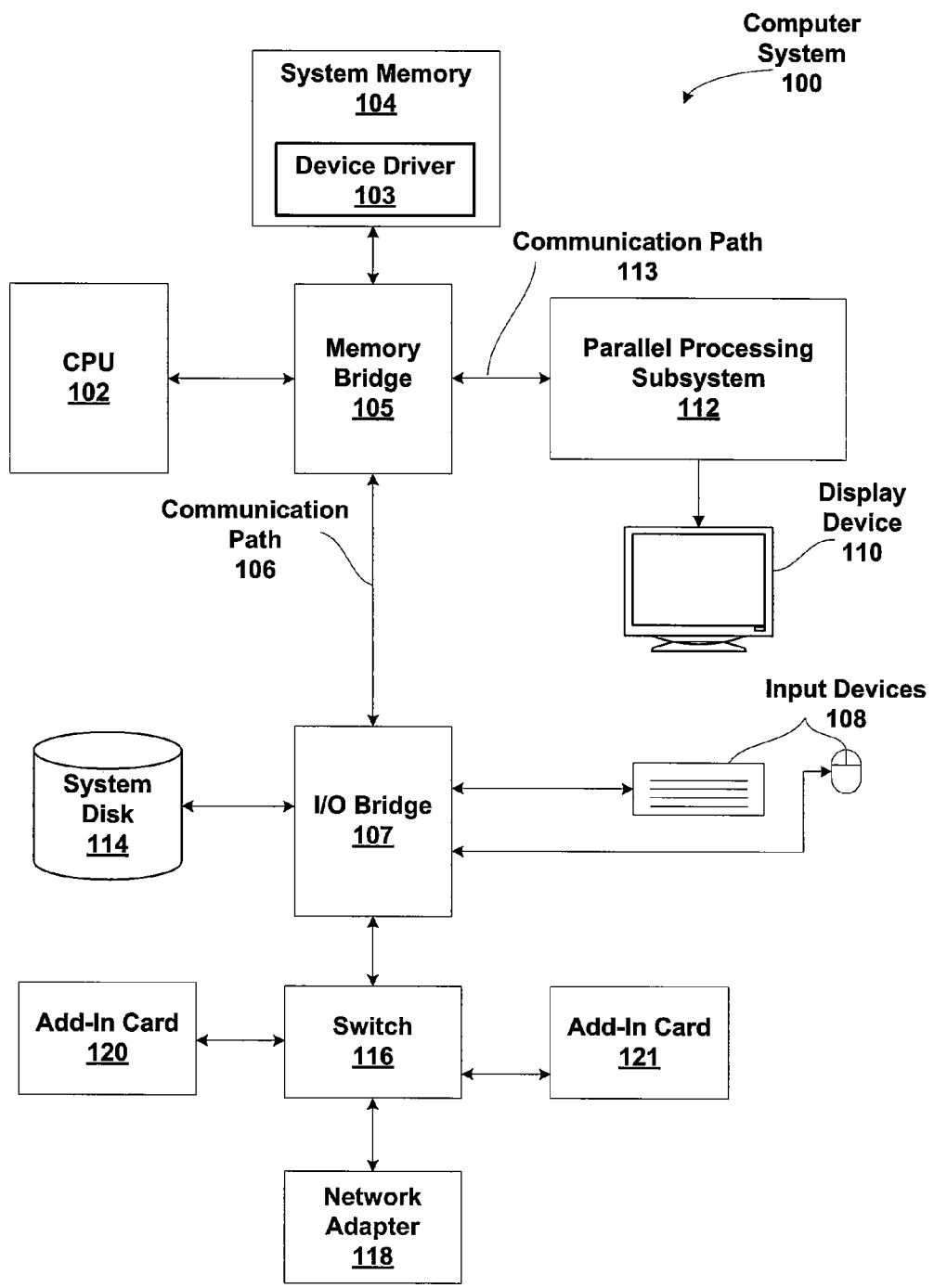
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
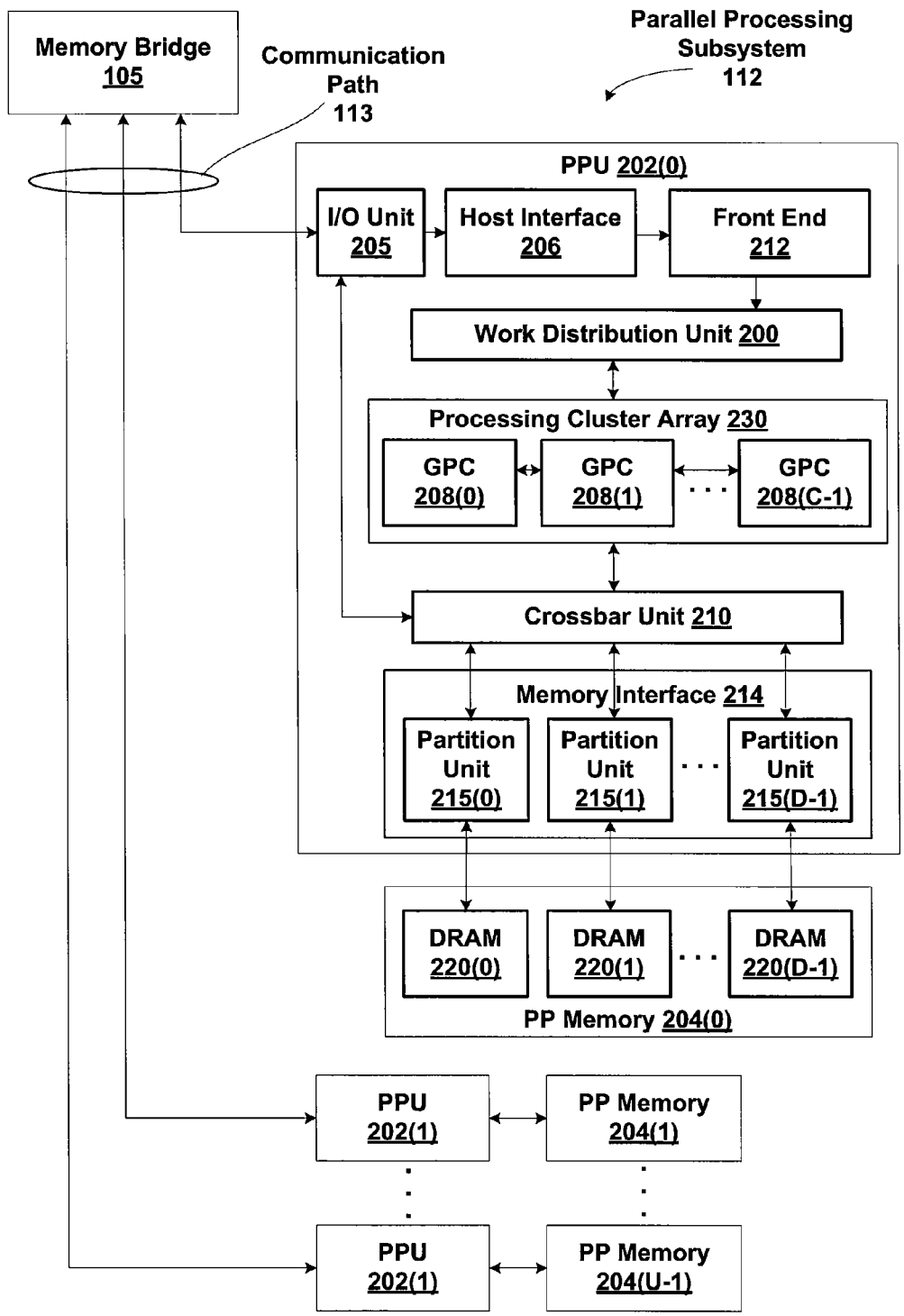
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in dynamically sized buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
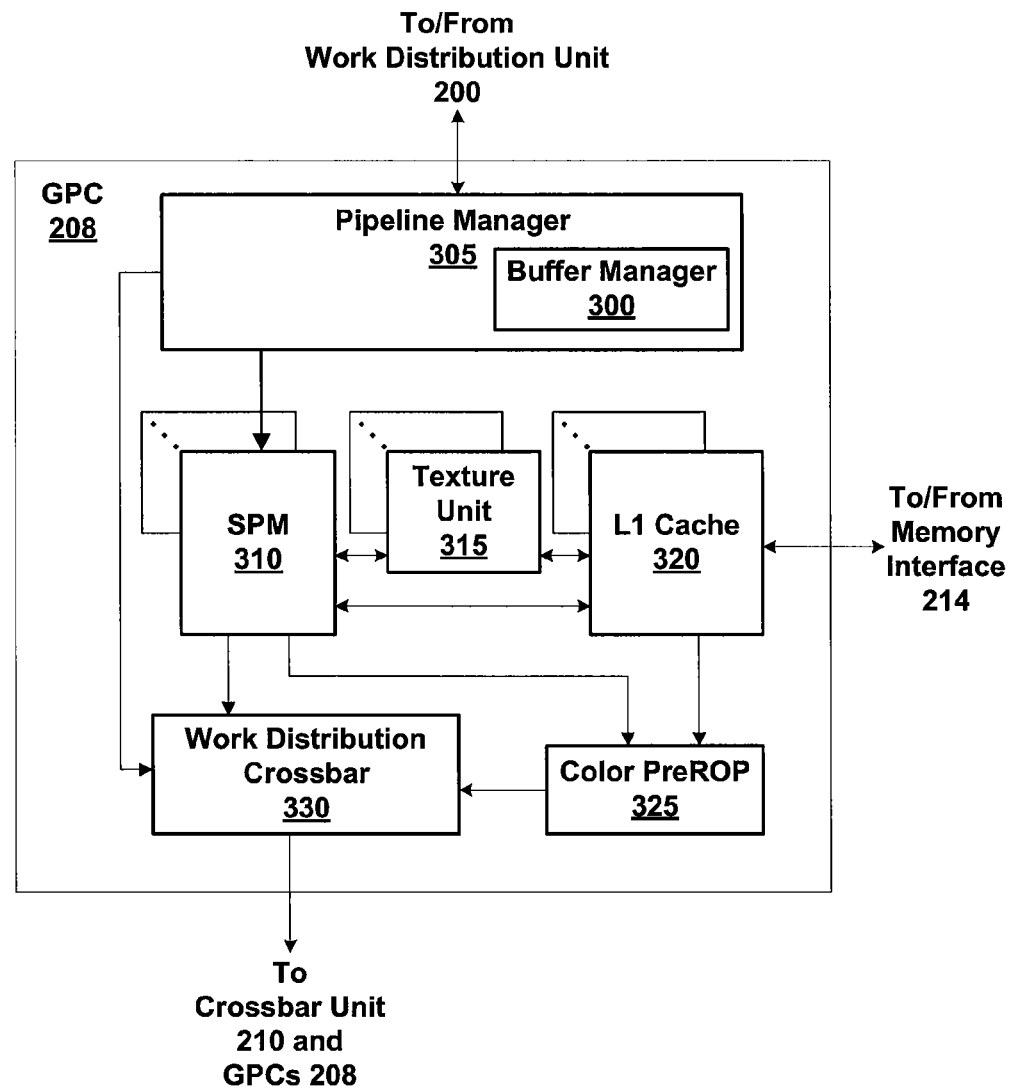
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310. A buffer manager 300 within pipeline manager 305 is configured to read and write dynamically sized buffers, as described in conjunction with FIGS. 4, 5A, 5B, 6A, 6B, 6C, 7A, and 7B.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
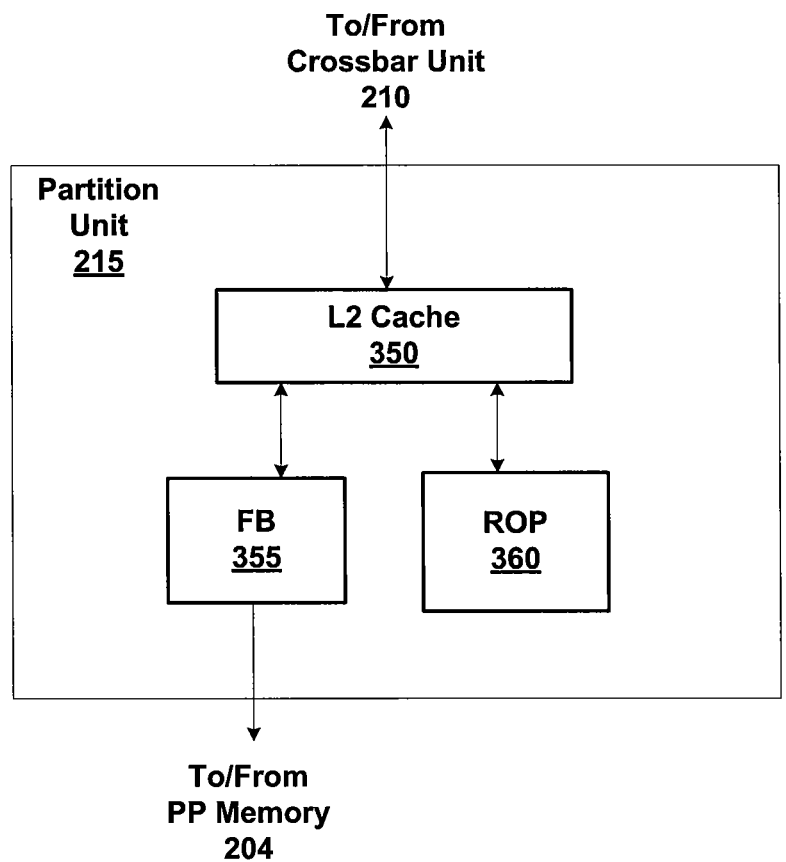
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes an L2 cache 350, a frame buffer (FB) 355, and a raster operations unit (ROP) 360. L2 cache 350 is a read/write cache that is configured to perform load and store operations received from crossbar unit 210 and ROP 360. Each L2 cache 350 is a portion of a large distributed on-chip storage resource that serves as an intermediate point between an external memory (e.g., PP memory 204) and GPCs 208 and ROPs 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
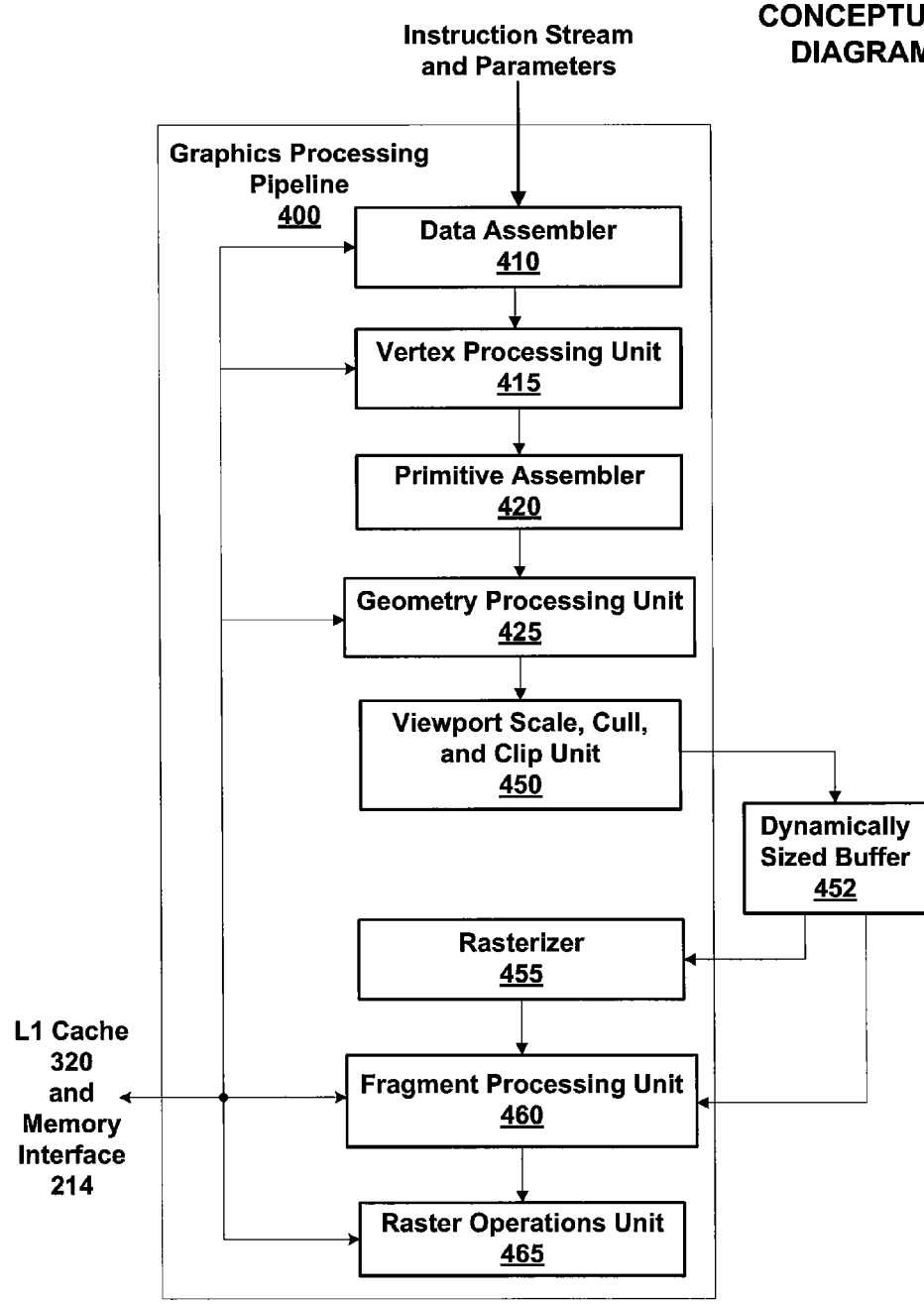
FIG. 4 is a conceptual diagram of a graphics processing pipeline, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, L2 cache 350, parallel processing memory 204, or system memory 104 by data assembler 410 for use in processing the vertex data.

Primitive assembler 420 receives vertex attributes from vertex processing unit 415, reading stored vertex attributes via L1 cache 320, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives. In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in L1 cache 320, L2 cache 350, parallel processing memory 204, or system memory 104 for use in processing the geometry data. Viewport scale, cull, and clip unit 450 performs clipping, culling, and viewport scaling and outputs processed graphics primitives to a rasterizer 455 through dynamically sized buffer 452.

Dynamically sized buffer 452 may be stored in L2 cache 350 and data from dynamically sized buffer 452 may be transferred to L1 cache 320, parallel processing memory 204, or system memory 104. In contrast with a conventional processing pipeline that includes FIFOs or other dedicated buffering with a fixed storage capacity between pipeline units, such as viewport scale, cull, and clip unit 450 and rasterizer 455, dynamically sized buffer 452 is stored in a shared storage resource. Therefore, unused storage capacity may be used by other dynamically sized buffers 452 or to store data accessed by other processing units in graphics processing pipeline 400, e.g., data assembler 410, vertex processing unit 415, geometry processing unit 425, fragment processing unit 460, and raster operations unit 465. A dynamically sized buffer 452 may be used to pass data or commands between any processing units of geometry processing pipeline 400.

Rasterizer 455 scan converts the new graphics primitives and outputs fragments and coverage data to fragment processing unit 460. Additionally, rasterizer 455 may be configured to perform z culling and other z-based optimizations. Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in dynamically sized buffer 452, parallel processing memory 204, or system memory 104 via L2 cache 320 for use in processing the fragment data. Fragments may be shaded at pixel, sample, or other granularity, depending on the programmed sampling rate.

Raster operations unit 465 is a processing unit that performs raster operations, such as stencil, z test, and the like, and outputs pixel data as processed graphics data for storage in graphics memory. The processed graphics data may be stored in graphics memory, e.g., dynamically sized buffer 452, parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Using the L2 Cache to Store Dynamically Sized Buffers

Figure 5A:
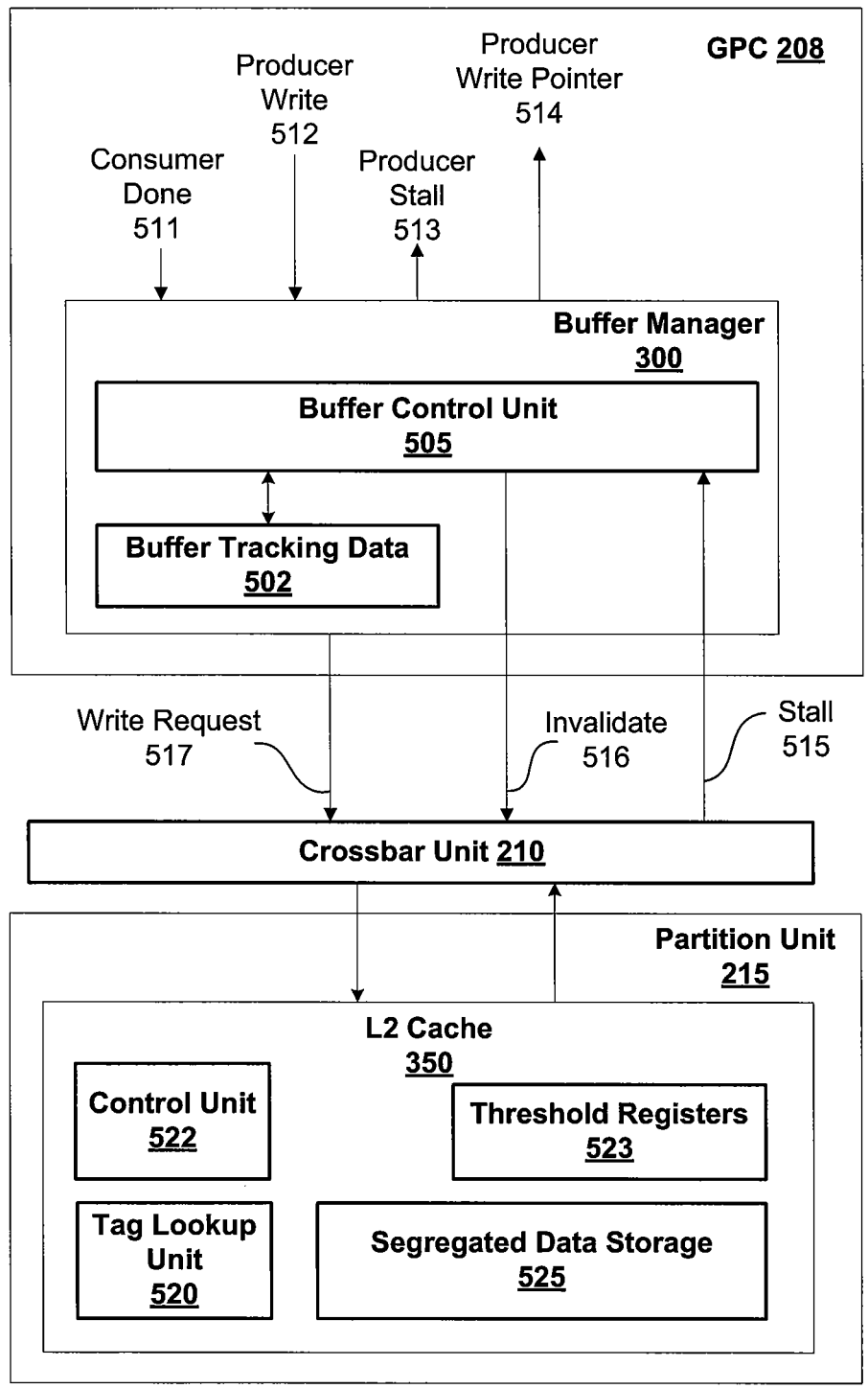
FIG. 5A is a more detailed block diagram of a buffer manager of FIG. 3B, a crossbar unit, and L2 cache, according to one embodiment of the present invention.

FIG. 5A is a more detailed block diagram of buffer manager 300 of FIG. 3B, crossbar unit 210, and L2 cache 350, according to one embodiment of the present invention. As shown, the partition unit 215 includes L2 cache 350, and is coupled to the GPCs 208 via the crossbar unit 210. Again, while there may be C GPCs 208 and D partition units 215, each including an L2 cache 350, only one GPC 208 and L2 cache 350 is described herein for the sake of simplicity. Similarly, although GPC and partition unit 215 include units other than buffer manager 300 and L2 cache 350, respectively, those units are not shown in FIG. 5A.

Buffer control unit 505 receives producer write requests 512 to dynamically sized buffers that are generated within GPC 208. Buffer control unit 505 returns a producer write pointer 514 and the producer transmits a producer write request to L2 cache 350 via write request 517. Alternatively, buffer control unit 505 may pass the producer write request to L2 cache 350. A consumer done 511 signal is asserted when a consumer is done using data stored in a dynamically sized buffer. A particular dynamically sized buffer may be read by more than one consumer, therefore a read of an entry by one consumer does not indicate that the entry of a dynamically sized buffer is no longer needed. Furthermore, a consumer may read an entry of a dynamically sized buffer multiple times. In some embodiments of the present invention, a read pointer is maintained for each consumer and the read pointer is incremented after the consumer indicates it is done reading the entry. A consumer mask representing all of the consumers of each dynamically sized buffer is stored in buffer tracking data 502. In one embodiment of the present invention, the dynamically sized buffers are stored as circular buffers or FIFOs. A write pointer, a read pointer, a consumer mask, and a consumer done mask are stored in buffer tracking data 502 for each dynamically sized buffer. Note that a consumer mask is stored for each entry when the consumers read entries of a dynamically sized buffer at different rates. Buffer control unit 505 updates buffer tracking data 502 as the producers write each dynamically sized buffer and consumers read each dynamically sized buffer. The consumer done mask initialized to equal the consumer mask and as each consumer indicates it is done reading the entry pointer to by the read pointer, the consumer done mask is updated. When all of the consumers that access a particular dynamically sized buffer have indicated that they are done reading the entry pointed to by the read pointer, the consumer done mask is reset to the consumer mask and buffer control unit 505 asserts an invalidate signal 516 to invalidate the particular entry.

Read or write requests are transmitted from GPC 208 to L2 cache 350 via crossbar unit 210. A segregated data storage 525 within L2 cache 350 is configured to store outgoing data associated with write requests and incoming data associated with read requests received from GPC 208. L2 cache 350 also receives read and write requests from ROP 360. L2 cache 350 includes an arbiter to select between requests received from multiple GPCs 208 and ROP 360. The requests specify an eviction class that is used to segregate the data in segregated data storage 525 and identify data that can be evicted to free up cache lines in segregated data storage 525. In some embodiments of the present invention, the eviction class is determined by L2 cache 350 based on the address provided with the request.

L2 cache 350 includes a tag lookup unit 520, threshold registers 523, and a control unit 522. Tag lookup unit 520 is configured to manage the flow of data into and out of segregated data storage 525. Upon receiving a request, tag lookup unit 520 first looks at the locations in segregated data storage 525 that may correspond to the memory address in the request to determine whether the data associated with the request is currently residing at, in the case of a read request, or can be written to, in the case of a write request, that location. If so, then, in the case of a write request, tag lookup unit 520 causes the data associated with the request to be written to the associated location of segregated data storage 525. For a read request, tag lookup unit 520 causes data to be transmitted from segregated data storage 525 to the requesting unit. If there is a cache miss (meaning that the data associated with the request is not resident at or cannot be written to that location within segregated data storage 525), then control unit 522 implements a series of cache eviction policies based on how the data currently residing in segregated data storage 525 is categorized, as well as the eviction class of that data, to make room for the data associated with the new request.

In one embodiment, segregated data storage 525 includes physically-indexed and tagged set-associative data caches. Each data cache may be divided into multiple segments, where each segment is divided into multiple rows, and each row is divided into multiple cache lines. Data residing in segregated data storage 525 may be transmitted to FB 355 for storage in PP memory 204, and data stored in PP memory 204 may be transmitted via FB 355 for storage in segregated data storage 525. Similarly, data stored in segregated data storage 525 may be transmitted to and from ROP 360 and GPC 208 (via crossbar 210).

Data stored in a cache line is categorized as "clean" or "dirty," "pinned" or "unpinned" and also has an eviction class. Stored data is deemed to be clean if the data is coherent with the corresponding data in PP memory 204. Stored data is deemed to be dirty if the data is not coherent with the corresponding data in PP memory 204. Dirty data should be cleaned prior to being evicted. Stored data is deemed to be pinned if that data is the target of an active read or write request, for example, being read or written by GPC 208 or ROP 360 or when data is being fetched from PP memory 204 in response to a cache miss. Pinned data should not be evicted from segregated data storage 525. Unpinned data constitutes data stored in a cache line of segregated data storage 525 that is not pinned. Data that is unpinned and not dirty is evictable. In addition to being categorized, data stored in segregated data storage 525 is also associated with an eviction class, e.g., first, normal, and buffer.

In one embodiment, the eviction classes are based on the data classes of the unit that accesses the data. ROP data is classified as a first eviction class because this data is rarely, if at all, reused and should be evicted first. Texture data is classified as a normal eviction class, because this data is occasionally reused and, therefore, should be stored in segregated data storage 525 for at least a certain period of time. Dynamically sized buffer data is classified as a buffer eviction class because this data is reused by GPCs 208 and, therefore, should be stored in segregated data storage 525 until GPCs 208 no longer need the data. Other embodiments may include more or fewer eviction classes or may present different eviction class hierarchies based on the data classes present in the system.

In one embodiment, the tag lookup unit 520 is precluded from evicting dynamically sized buffer data, which is classified as buffer eviction class data. Instead, when the dynamically sized buffer data is no longer needed by GPC 208, Buffer control unit 505 is configured to transmit a signal, invalidate 516, to L2 cache 350 that causes tag lookup unit 520 to invalidate the dynamically sized buffer data. A cache line that holds invalidated dynamically sized buffer data is treated as empty and may be reused by tag lookup unit 520, as needed. When a cache miss occurs and none of the data residing in the identified cache lines can be evicted, as described in conjunction with FIG. 6C, then control unit 522 causes the received request to stall by asserting stall 515 until the data residing in one of the cache lines is evicted from segregated data storage 525. Control unit 522 monitors the allocation of cache lines for the different eviction classes and stalls write requests for producers attempting to write data whose allocation has reached a threshold stored in threshold registers 523.

Figure 5B:
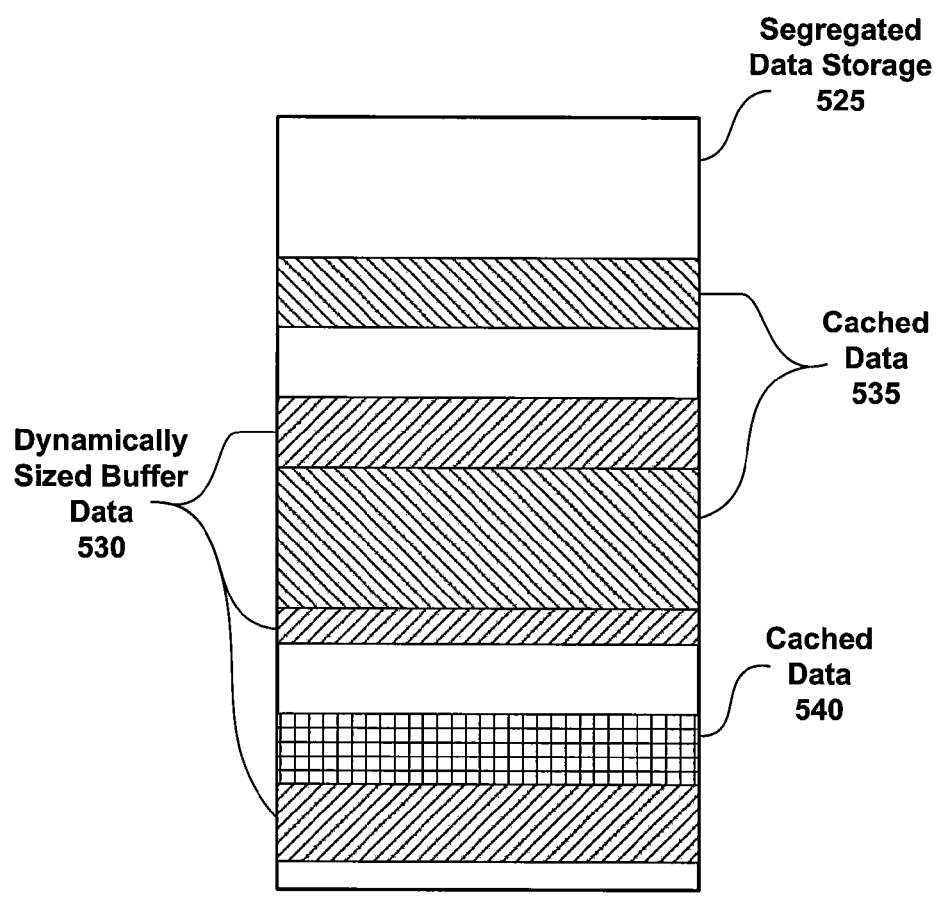
FIG. 5B is a conceptual diagram showing the data types stored in the segregated data storage of FIG. 5A, according to one embodiment of the present invention.

FIG. 5B is a conceptual diagram showing the data stored in segregated data storage 525 of FIG. 5A for different eviction classes, according to one embodiment of the present invention. As shown, segregated data storage 525 includes three different eviction classes of data, dynamically sized buffer data 530, cached data 535, and cached data 540. Cached data 535 may be texture data and cached data 540 may be ROP data. Portions of cached data 535 and cached data 540 may be categorized as dirty and/or pinned. Portions of dynamically sized buffer data 530 may be categorized as pinned. Dynamically sized buffer data 530 is typically not considered dirty since buffer eviction class data is not stored in PP memory 204.

Programmable thresholds stored in threshold registers 523 may be used to limit the number of cache lines allocated to store buffer eviction class data and the maximum number of entries that are dirty and pinned. When the threshold to limit the number of cache lines allocated to store buffer eviction class data, max_buffer, is exceeded, tag lookup unit 520 identifies the least recently used dynamically sized buffer data and re-classifies or demotes that data to be first eviction class. The demoted data is also re-categorized as dirty and it may be evicted after it is cleaned. The cache lines in segregated data storage 525 associated with the demoted dynamically sized buffer data can then be reserved for texture data, ROP data, or other dynamically sized buffer data.

Another programmable threshold stored in threshold registers 523, max_dirtyorpinned, sets forth the maximum number of cache lines in segregated data storage 525 that can store dirty or pinned data. In one embodiment, only dirty or pinned normal eviction class data and first eviction class data count against the max_dirtyorpinned threshold. Upon receiving a new read or write request, control unit 522 is configured to determine whether storing the data associated with that request in segregated data storage 525 will cause the number of dirty or pinned data in segregated data storage 525 to exceed the max_dirtyorpinned threshold. If so, then the control unit 522 stalls the request until the requisite space in segregated data storage 525 becomes available.

As persons skilled in the art will recognize, if max_buffer is set too low, the buffer data may be demoted and evicted from the cache, which may increase the processing time of subsequent accesses to the buffer by consumers. However, if max_buffer is set too high, then there may not be enough room in segregated data storage 525 to store an adequate amount of first and normal eviction class data, which also can result in poor system performance. In some embodiments of the present invention, max_buffer, max_dirtyorpinned, and other thresholds may be set at the application level. Device driver 103 then configures L2 cache 350 to store and enforce the thresholds. In this manner, the eviction policies of L2 cache 350 can be optimized to suit the specific needs of a given application.

Figure 6A:
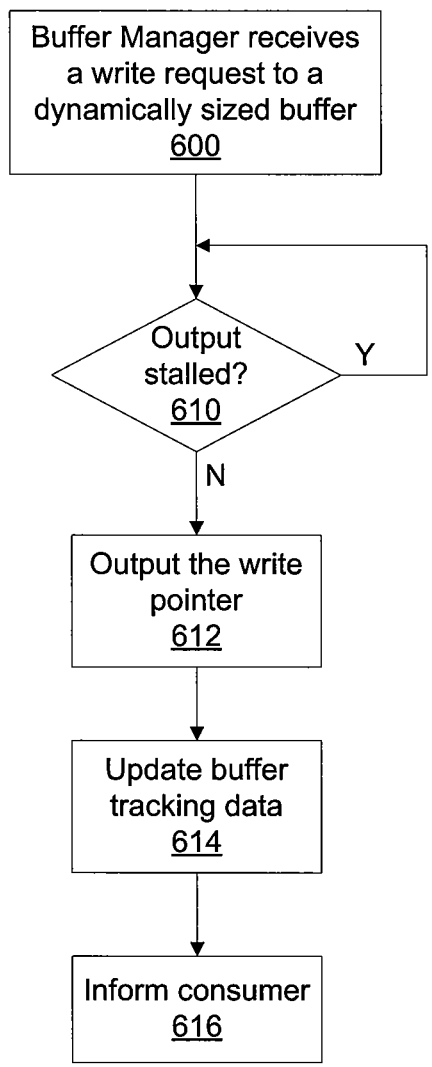
FIG. 6A is a flow diagram of method steps for writing to a dynamically sized buffer, according to one embodiment of the present invention.

FIG. 6A is a flow diagram of method steps for writing to a dynamically sized buffer, according to one embodiment of the present invention. The method begins at step 600 where buffer manager 300 receives a write request to a dynamically sized buffer from a producer. The eviction class of the data to be written may be inferred based on the producer or the eviction class may be specified by the producer, but for a dynamically sized buffer it will be set to the buffer eviction class. At step 610 buffer manager 300 determines if stall 515 is asserted, and, if so, step 610 is repeated. Otherwise, at step 612 buffer manager 300 outputs a write pointer to the producer and the producer outputs the write request to L2 cache 350 via crossbar unit 210. At step 614 buffer manager 300 updates buffer tracking data 502 to increment the write pointer for the dynamically sized buffer. At step 616 buffer manager 300 informs the consumers of the dynamically sized buffer specified by the write request, that the dynamically sized buffer has been written. Alternatively, consumers may poll buffer tracking data 502 to determine if data is available or the producer may notify the consumers that the data is available.

Figure 6B:
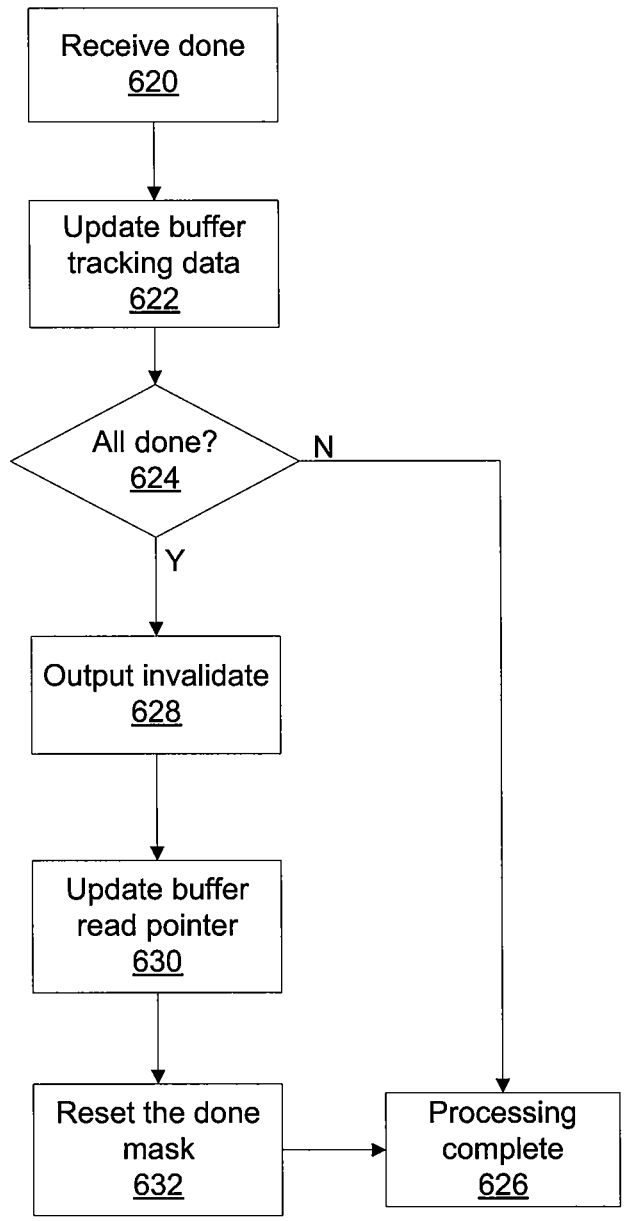
FIG. 6B is a flow diagram of method steps for invalidating an entry in a dynamically sized buffer, according to one embodiment of the present invention.

FIG. 6B is a flow diagram of method steps for invalidating an entry in a dynamically sized buffer, according to one embodiment of the present invention. At step 620 buffer manager 300 receives a consumer done 511 signal from a consumer of a dynamically sized buffer. At step 622 buffer manager 300 updates buffer tracking data 502 by clearing a bit of the consumer done mask that corresponds to the consumer for the dynamically sized buffer entry. In embodiments of the present invention that maintain a read pointer for each consumer, the read pointer associated with the consumer sending the done signal is updated, i.e., incremented. At step 624 buffer manager 300 determines if all of the consumers for the dynamically sized buffer are done reading the entry corresponding to the read pointer, i.e., if all bits of the consumer done mask are cleared. When all of the consumers are not done, then at step 626 processing of the done signal is complete.

When all of the consumers are done, then at step 628 buffer manager 300 asserts invalidate 516 to L2 cache 350 and L2 cache 350 invalidates the entry corresponding to the read pointer for the dynamically sized buffer. Invalidate 516 indicates which entry of a dynamically sized buffer stored in segregated data storage 525 is invalidated. At step 630 buffer manager 300 updates, i.e., increments, the read pointer for the dynamically stored buffer that is stored in buffer tracking data 502. In embodiments of the present invention that maintain a read pointer for each consumer, step 300 is omitted since the read pointer is updated in step 622. At step 632 buffer manager 300 resets the consumer done mask stored in buffer tracking data 502 for the dynamically sized buffer. At step 626 processing of the done signal is complete. As previously described, the processing of done signals may be occurring simultaneously for different entries in the dynamically sized buffer.

Figure 6C:
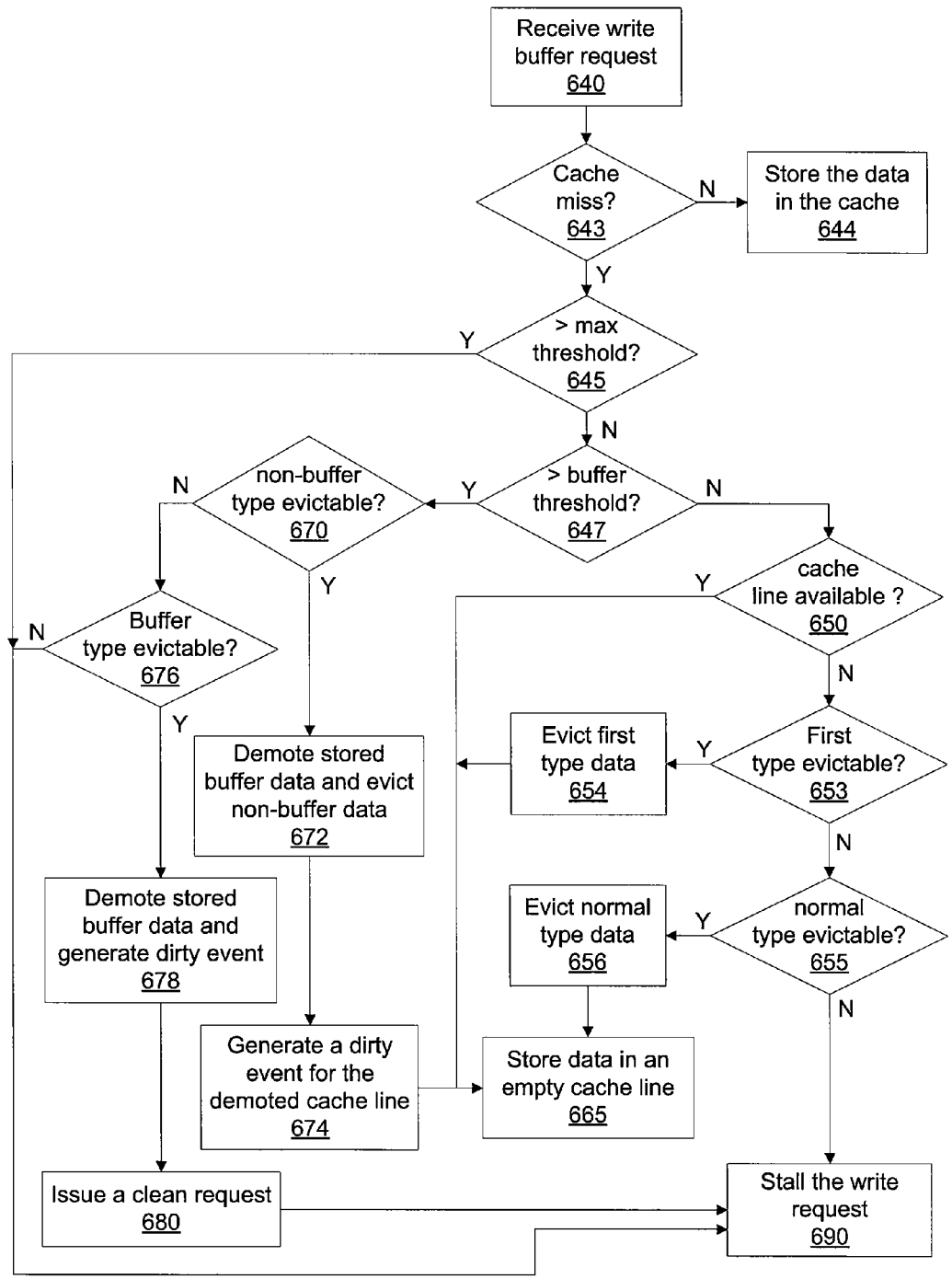
FIG. 6C is a flow diagram of method steps for processing a write to a cache line of a dynamically sized buffer, according to one embodiment of the present invention.

FIG. 6C is a flow diagram of method steps for processing a write to a cache line of a dynamically sized buffer, according to one embodiment of the present invention.

The method 600 begins at step 640, where L2 cache 350 receives a write request from buffer manager 300. As described above in conjunction with FIG. 5A, the write request includes a corresponding memory address of the location within PP memory 204 where the data associated with the request is written to. Each request also includes the eviction class of the data to be written.

At step 643, tag lookup unit 520 determines whether there is a cache miss, meaning that the data associated with the write request is not resident at or cannot be written to a location within segregated data storage 525. If, at step 643, tag lookup unit 520 determines there is not a cache miss, then in step 644 the data is stored in segregated data storage 525. Otherwise, in step 645 control unit 522 determines if the request will cause the number of dirty or pinned cache lines in segregated data storage 525 to exceed the max_dirtyorpinned threshold. If, at step 645 control unit 522 determines that storing the data will cause the max_dirtyorpinned threshold to be exceeded, then at step 690 the write request is stalled and, if the write request is resubmitted, the method is repeated until a cache line becomes available to store the data.

If, at step 645 control unit 522 determines that storing the data will not cause the max_dirtyorpinned threshold to be exceeded, then at step 647 control unit 522 determines if the request will cause the max_buffer threshold to be exceeded. If, the max_buffer threshold will not be exceeded, then at step 650 tag lookup unit 520 determines if a cache line in segregated data storage 525 is available. A cache line is available when the write request data may be stored using the corresponding memory address of the location within PP memory 204 in conjunction with standard set-associative caching techniques. If a cache line is available, then at step 665 the data associated with the write request is written to the available cache line in segregated data storage 525. Otherwise, at step 653 tag lookup unit 520 determines if there is a cache line storing data of the first eviction class that is evictable, i.e., not pinned or dirty. If there is an evictable cache line storing data of the first eviction class, then at step 654 tag lookup unit 520 evicts the data stored in the evictable cache line and proceeds to step 665. In some embodiments of the present invention, the least-recently-used first eviction class data is evicted to make a cache line available for storing the buffer eviction class data. In other embodiments of the present invention, other characteristics are used to select the first eviction class data for demotion.

If, at step 653 tag lookup unit 520 fails to identify an evictable cache line storing data of the first eviction class, then at step 655 tag lookup unit 520 determines if there is a cache line storing data of the normal eviction class that is evictable. If there is an evictable cache line storing data of the normal eviction class, then at step 656 tag lookup unit 520 evicts the data stored in the evictable cache line and proceeds to step 665. Otherwise, at step 690 the write request is stalled and if the write request is resubmitted, the method is repeated until a cache line becomes available to store the data. In some embodiments of the present invention, the least-recently-used normal eviction class data is evicted to make a cache line available for storing the buffer eviction class data. In other embodiments of the present invention, other characteristics are used to select the normal eviction class data for demotion.

Returning to step 647, when control unit 522 determines that storing the data will cause the max_buffer threshold to be exceeded, at step 670 tag lookup unit 520 determines if data that is non-buffer eviction class, i.e., first or normal, is evictable. If the non-buffer eviction class data is evictable, then at step 672 tag lookup unit 520 demotes data stored in a cache line from the buffer eviction class to the first eviction class and evicts the non-buffer eviction class data to free the cache line storing the evictable data. In some embodiments of the present invention, the least-recently-used first or normal eviction class data that is clean and unpinned is evicted to make a cache line available. In other embodiments of the present invention, other characteristics are used to select the first or normal eviction class data for eviction. Similarly, the least-recently-used buffer eviction class data that is unpinned may be demoted to avoid exceeding the max_buffer threshold while freeing a cache line for storing the buffer eviction class data received with the write request.

At step 674 tag lookup unit 520 generates a dirty event for the cache line storing the demoted data, so the demoted data will be stored in PP memory 204 before the demoted data is evicted. Since buffer eviction class data is not ordinarily stored in PP memory 204, cache lines written with buffer eviction class data are not identified as dirty as they are written. Cache lines written with first and normal eviction class data are identified as dirty as that data is written. After step 674, tag lookup unit 520 proceeds to step 665 and stores the buffer eviction class data in the cache line whose data was evicted at step 672.

Returning to step 670, when tag lookup unit 520 determines that non-buffer eviction class data is not evictable, then at step 676 tag lookup unit 520 determine if any buffer eviction class data is evictable, i.e., unpinned. If none of the buffer eviction class data is evictable, then at step 690 the write request is stalled and, if the write request is resubmitted, the method is repeated until a cache line becomes available to store the data. Otherwise, at step 678 tag lookup unit 520 demotes the evictable buffer eviction class data to the first eviction class and generates a dirty event for the cache line storing the demoted data. In some embodiments of the present invention, the least-recently-used eviction class data that is unpinned is demoted to avoid exceeding the max_buffer threshold while freeing a cache line for storing the buffer eviction class data received with the write request. At step 680 control unit 522 issues a clean request before proceeding to step 690, where control unit 522 stalls the write request until the requisite space in segregated data storage 525 becomes available.

In some embodiments of the present invention, the clean request specifies cache lines storing the least-recently-used first eviction type data in order to make the data in those cache lines evictable. Control unit 522 may also be configured to issue clean requests when dirty thresholds are reached for first or normal eviction type data in order to improve the availability of cache lines. Although the method steps of FIGS. 6A, 6B, and 6C are described in conjunction with FIGS. 1, 2, 3A, 3B, 4, 5A, and 5B, persons skilled in the art will understand that any system configured to perform the method steps, in any order, falls within the scope of the present invention.

Configuring L2 cache 350 to buffer intermediate data in dynamically sized buffers enables intermediate data produced and consumed within a processing pipeline to be stored efficiently and guarantee that the associated buffer data is always present in the L2 cache, which minimizes latency for the dynamically sized buffer accesses. The L2 cache 350 is repurposed to perform the function of dedicated storage between one or more of the GPCs 208. The storage capacity of shared cache, L2 cache 350 is dynamically allocated to store data in dynamically sized buffers as needed, to avoid stalling upstream units. The dynamically sized buffer invalidate mechanism frees up cache lines to other request types when the data held by the cache lines is no longer needed by the dynamically sized buffer consumers. Overall system throughput may be improved while reducing the amount of dedicated storage used to store intermediate data.

Figure 7A:
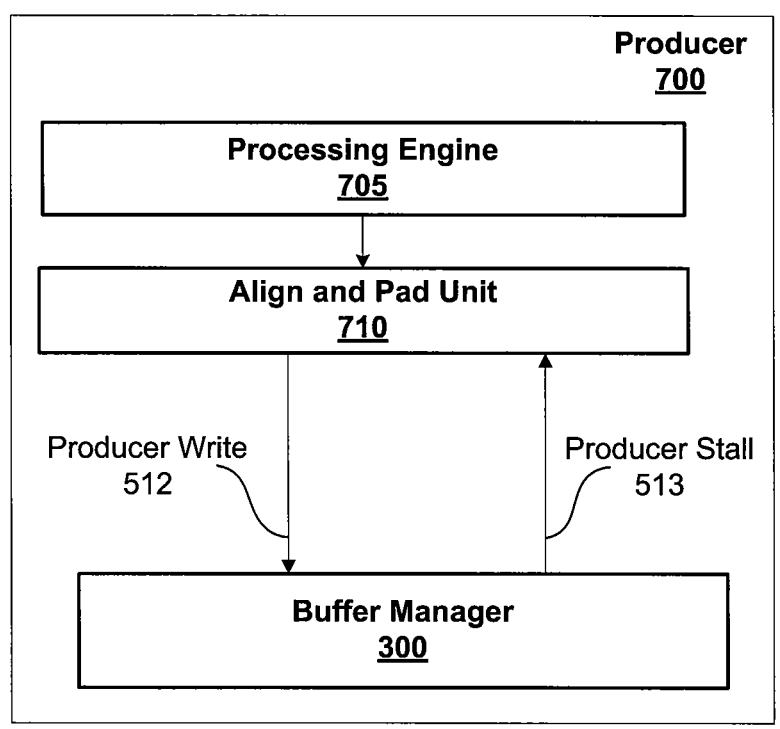
FIG. 7A is a block diagram of a producer of data that is written to a dynamically sized buffer, according to one embodiment of the present invention.

FIG. 7A is a block diagram of a producer 700 of data that is written to a dynamically sized buffer, according to one embodiment of the present invention. Producer 700 may be configured to produce dynamically sized buffer data, with processing engine 705 performing the functions of a GPC 208. The dynamically sized buffer data produced by processing engine 705 is output to an align and pad unit 710. When full cache lines are written for each dynamically sized buffer write request it is not necessary to output byte enables indicating which bytes of the write request are valid. In order to provide a full cache line of data, align and pad unit 710 aligns the data to a cache line boundary and pads the data as needed to fill an entire cache line.

Figure 7B:
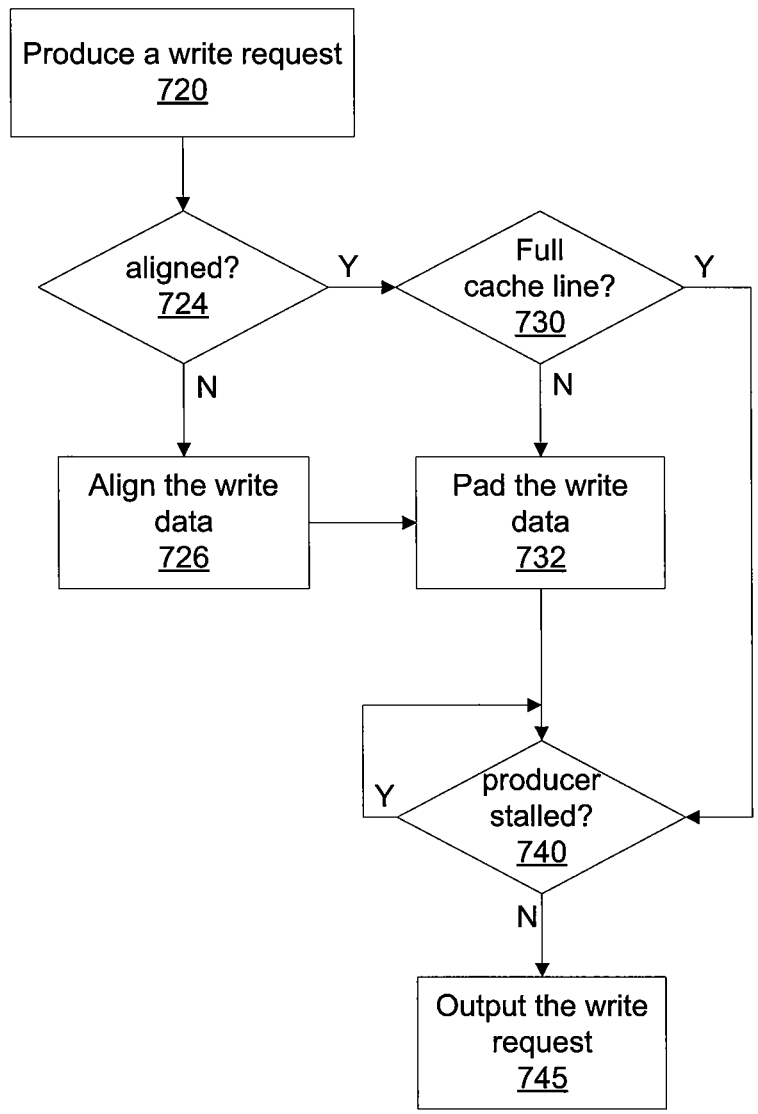
FIG. 7B is a flow diagram of method steps for producing full cache lines to write to a dynamically sized buffer, according to one embodiment of the present invention.

FIG. 7B is a flow diagram of method steps for producing full cache lines to write to a dynamically sized buffer, according to one embodiment of the present invention. At step 720 processing engine 705 produces a write request to a dynamically sized buffer. At step 724 align and pad unit 710 determines if the write request is aligned to a cache line boundary, and, if so, align and pad unit 710 proceeds to step 730. At step 730 align and pad unit 710 determines if the data fills an entire cache line, and, if so, align and pad unit 710 proceeds directly to step 740. Otherwise, align and pad unit 710 proceeds to step 732. At step 740 align and pad unit 710 determines if producer stall 513 is asserted indicating that buffer manager 300 cannot accept a write request. If buffer manager 300 cannot accept a write request, step 740 is repeated. Otherwise, at step 745 align and pad unit 710 outputs a write request to a dynamically sized buffer that includes data for a complete cache line.

If, at step 724 align and pad unit 710 determines that the write request is not aligned to a cache line boundary then, at step 726 align and pad unit 710 shifts the data as needed to align to correspond to an address that is cache line boundary aligned. At step 732 align and pad unit 710 pads the data, as needed, with one or more bytes of a predetermined value to fill an entire cache line. Since each write to a dynamically sized buffer includes data for a complete cache line, it is not necessary to include byte enables in producer write 512. Furthermore, byte enables are not used by portions of segregated data storage 515 that store dynamically sized buffer data, e.g., buffer eviction class data. Although the method steps of FIG. 7B are described in conjunction with FIGS. 1, 2, 3A, 3B, 4, 5A, 5B, and 7A, persons skilled in the art will understand that any system configured to perform the method steps, in any order, falls within the scope of the present invention.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for preparing and storing data in a cache coupled to multiple clients and to an external memory, the method comprising:
producing a write request including intermediate data for storage in a dynamically sized buffer that is shared between the multiple clients and configured to store multiple different types of data, wherein the dynamically sized buffer resides within the cache, the cache is configured to store data belonging to a first eviction class that is associated with raster-operations-unit-data, a second eviction class that is associated with texture data, and a dynamically sized buffer eviction class, the dynamically sized buffer is configured to store only data belonging to the dynamically sized buffer eviction class, and the dynamically sized buffer is configured to store intermediate data produced by a graphics processing cluster;
aligning the intermediate data to correspond with an address that is aligned to a cache line boundary to produce aligned intermediate data;
specifying the dynamically sized buffer eviction class for the aligned intermediate data, wherein the dynamically sized buffer eviction class indicates that data stored in the cache that is both evictable and belonging to either the first eviction class or the second eviction class should be evicted from the cache before the aligned intermediate data is evicted from the cache; and
outputting the write request including the aligned intermediate data with an indication of the dynamically sized buffer eviction class.

2. The computer-implemented method of claim 1, further comprising the step of writing a cache line in the cache with the aligned intermediate data.

3. The computer-implemented method of claim 2, further comprising the step of invalidating the cache line storing the aligned intermediate data when all reads of the aligned intermediate data from the cache are completed.

4. The computer-implemented method of claim 2, wherein one or more clients configured as consumers read the aligned intermediate data from the cache line.

5. The computer-implemented method of claim 2, wherein a single client configured as a consumer reads the aligned intermediate data from the cache line multiple times.

6. The computer-implemented method of claim 1, further comprising the steps of evicting data that belongs to the first eviction class or the second eviction class when a cache miss occurs.

7. The computer-implemented method of claim 6, wherein the evicted data is unpinned data that is targeted by an active read or write request.

8. The computer-implemented method of claim 6, wherein the evicted data is clean data that is coherent with corresponding data in the external memory.

9. The computer-implemented method of claim 1, further comprising the step of determining that storing the aligned intermediate data in the cache will not cause a maximum number of dynamically sized buffer entries to be exceeded.

10. The computer-implemented method of claim 1, further comprising the step of padding the aligned intermediate data with predetermined values to fill an entire cache line with a combination of the aligned intermediate data and the predetermined values.

11. The computer-implemented method of claim 1, wherein unused storage resources associated with the dynamically sized buffer are available to be allocated to an additional dynamically sized buffer for use by a different multiple clients.

12. The computer-implemented method of claim 1, wherein specifying the dynamically sized buffer eviction class for the aligned intermediate data is performed based on a memory address associated with the write request.

13. A system configured to prepare and store data in a cache, the system comprising:
a cache coupled to an external memory and configured to store intermediate data in entries allocated to a dynamically sized buffer that is shared between multiple clients and configured to store multiple different types of data and that is configured to store intermediate data produced by a graphics processing cluster, wherein the cache is further configured to store data belonging to a first eviction class that is associated with raster-operations-unit-data, a second eviction class that is associated with texture data, and a dynamically sized buffer eviction class;
a computation subsystem including a producer of intermediate data that is coupled to the cache and a first consumer of the intermediate data that is coupled to the cache, the producer configured to:
produce a write request including the intermediate data for storage in the dynamically sized buffer;
align the intermediate data to correspond with an address that is aligned to a cache line boundary and produce aligned intermediate data;
specify the dynamically sized buffer eviction class for the aligned intermediate data, wherein the dynamically sized buffer eviction class indicates that data stored in the cache that is both evictable and belonging to either the first eviction class or the second eviction class should be evicted from the cache before the aligned intermediate data is evicted from the cache; and
output the write request including the aligned intermediate data with an indication of the dynamically sized buffer eviction class; and
a buffer manager coupled between the computation subsystem and the cache and configured to manage the dynamically sized buffer.

14. The system of claim 13, wherein the cache is further configured to store the aligned intermediate data in a cache line that is allocated to the dynamically sized buffer.

15. The system of claim 14, wherein the first consumer is configured to invalidate the cache line storing the aligned intermediate data when all reads of the aligned intermediate data from the cache are completed.

16. The system of claim 14, wherein multiple consumers read the aligned intermediate data from the cache line.

17. The system of claim 14, wherein a single consumer reads the aligned intermediate data from the cache line multiple times.

18. The system of claim 13, wherein the cache is further configured to evict data that belongs to the first eviction class or the second eviction class when a cache miss occurs.

19. The system of claim 18, wherein the evicted data is unpinned data that is targeted by an active read or write request.

20. The system of claim 18, wherein the evicted data is clean data that is coherent with corresponding data in the external memory.

21. The system of claim 13, wherein the cache is further configured to determine that storing the aligned intermediate data in the cache line will not cause a maximum number of dynamically sized buffer entries to be exceeded.

22. The system of claim 13, wherein the producer is configured to pad the aligned intermediate data with predetermined values to fill an entire cache line with a combination of the aligned intermediate data and the predetermined values.

23. The system of claim 13, wherein unused storage resources associated with the dynamically sized buffer are available to be allocated to an additional dynamically sized buffer for use by a different multiple clients.

24. The system of claim 13, wherein the computation subsystem is further configured to specify the dynamically sized buffer eviction class for the aligned intermediate data based on a memory address associated with the write request.

* * * * *